United States Patent [19]

Uphues et al.

[11] Patent Number: 5,335,937
[45] Date of Patent: Aug. 9, 1994

[54] COVER FOR VEHICLE OCCUPANT IMPACT PROTECTION DEVICE

[75] Inventors: Hans-Wilhelm Uphues, Magstadt; Zivojin Petkovic, Böblingen; Wolfgang Henseler, Tübingen; Manfred Müller, Deizisau; Stephan Schreiner, Mötzingen; Thomas Witkovsky, Grafenau; Thomas Fischer, Calw-Stammheim; Rolf Schumacher, Sindelfingen; Bruno Möltgen, Tiefenbronn, all of Fed. Rep. of Germany

[73] Assignee: Mercedes-Benz AG, Fed. Rep. of Germany

[21] Appl. No.: 115,682

[22] Filed: Sep. 3, 1993

[30] Foreign Application Priority Data

Sep. 3, 1992 [DE] Fed. Rep. of Germany ....... 4229379

[51] Int. Cl.⁵ .................................................. B60R 21/16
[52] U.S. Cl. ................................. 280/728 B; 280/732
[58] Field of Search ................... 280/728 B, 731, 732, 280/728 R, 728 A, 75 D

[56] References Cited

U.S. PATENT DOCUMENTS

| | | | |
|---|---|---|---|
| 3,013,064 | 5/1991 | Miller et al. | 280/731 |
| 4,327,937 | 5/1982 | Scholz et al. | 280/232 |
| 4,878,689 | 11/1989 | Mitzkus et al. | 280/731 |
| 4,911,471 | 3/1990 | Hirabayashi | 280/732 |
| 5,060,972 | 10/1991 | Satoh et al. | 280/728 B |
| 5,066,037 | 11/1991 | Castrigno et al. | 280/728 B |
| 5,082,310 | 1/1992 | Bauer | 280/732 |
| 5,217,253 | 6/1993 | Pray | 280/728 A |

FOREIGN PATENT DOCUMENTS

| | | |
|---|---|---|
| 2045245 | 5/1971 | Fed. Rep. of Germany . |
| 2320272 | 11/1973 | Fed. Rep. of Germany . |
| 2848547 | 5/1980 | Fed. Rep. of Germany . |
| 3605623 | 8/1987 | Fed. Rep. of Germany . |
| 3811373 | 10/1988 | Fed. Rep. of Germany . |
| 3800652 | 3/1991 | Fed. Rep. of Germany . |
| 4030187 | 4/1991 | Fed. Rep. of Germany . |
| 4139417 | 6/1992 | Fed. Rep. of Germany . |
| 4015145 | 1/1992 | Japan ................ 280/728 B |
| 2246983 | 2/1992 | United Kingdom ........... 280/728 B |

*Primary Examiner*—Brian L. Johnson
*Assistant Examiner*—Christopher P. Ellis
*Attorney, Agent, or Firm*—Evenson, McKeown, Edwards & Lenahan

[57] ABSTRACT

Impact protection devices, arranged in steering wheels or dashboards of motor vehicles, for vehicle occupants are provided with covers which open in the event of an accident in order to release an inflating air bag of the protection device. The cover, which consists of at least one cover flap, is injection molded onto a carrier part by a tough elastic plastic. The plastic surround has along an edge, intended as pivot axis, of the cover flap a cross-sectional tapering which serves as a hinge. At the other edges, the plastic surround is constructed towards the corresponding edges of the carrier part as a groove which, in the event of pressure on the cover flap in the opening direction, easily releases the carrier part edge.

20 Claims, 1 Drawing Sheet

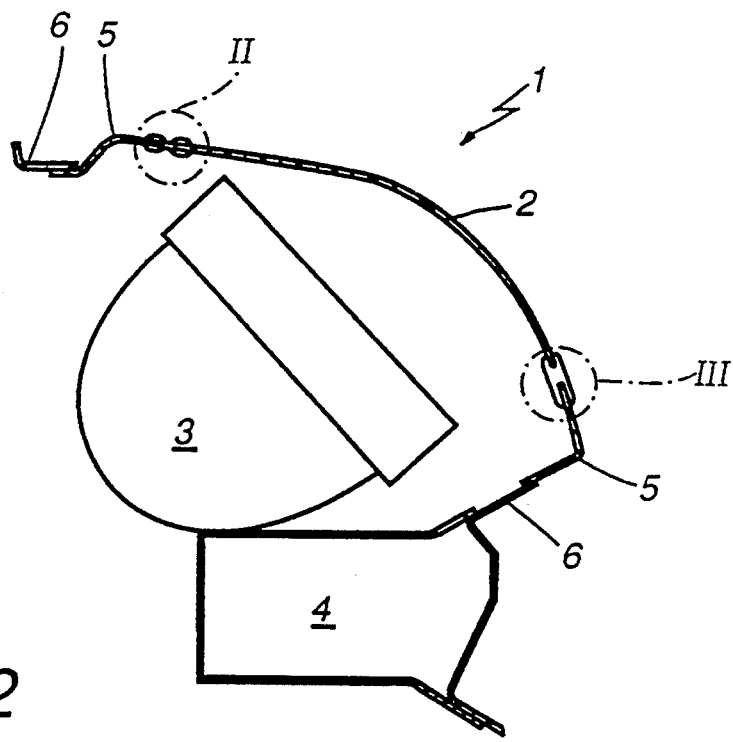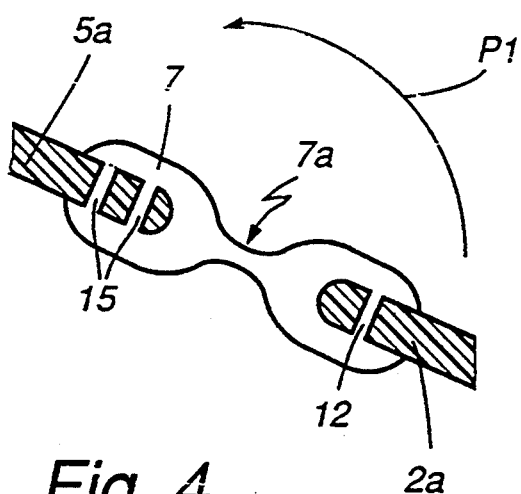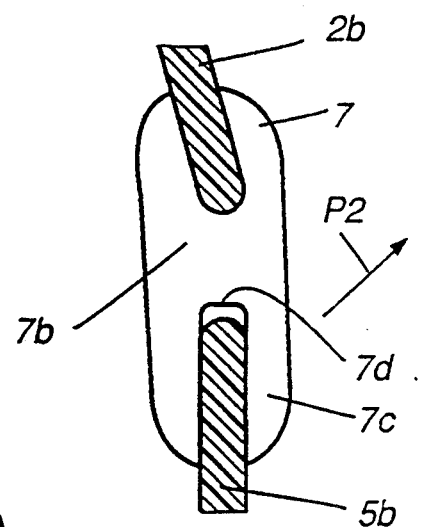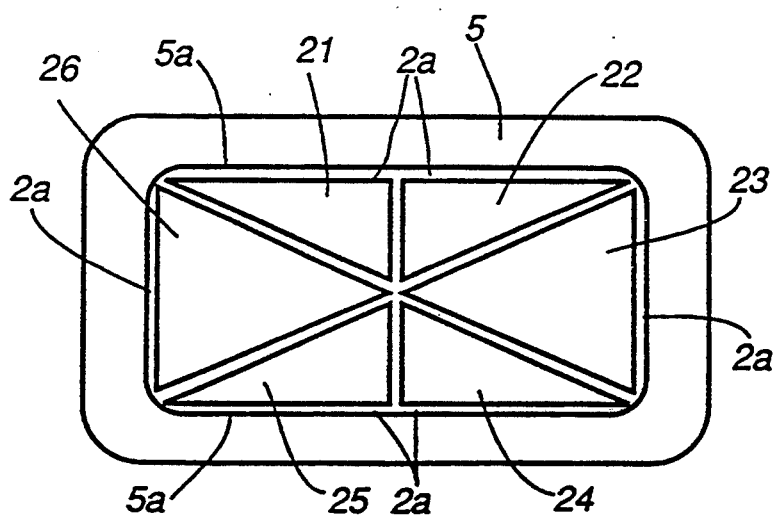

COVER FOR VEHICLE OCCUPANT IMPACT PROTECTION DEVICE

BACKGROUND AND SUMMARY OF THE INVENTION

The present invention relates to a cover for an impact protection device air bag for vehicle occupants, and, more particularly, to a cover having at least one upwardly pivoting cover flap in, for example, the dashboard of a vehicle.

Impact protection devices which are accommodated in the dashboard of vehicles and have a cover consisting of one or more cover flaps are known. For example, DE-PS 38 00 652 describes a cover flap for the air bag of an impact protection device for motor vehicle occupants. This device has a base part which is held at its one side edge by joints and at the other opposite side edge by tear-off connections on the dashboard of a vehicle. The tear off connections are constructed as tear-off elements which each have two attachment parts which are connected to one another by a flexible articulation element. One of the attachment parts here can be connected to the base part of the cover flap or be of integral construction therewith and the other attachment part can be connected to the dashboard. The articulation element which connects the two base parts to one another has a reduced cross-section with respect to the attachment parts. This point with reduced cross-section constitutes a predetermined break point which, in the case of an accident, breaks as a result of the pressure exerted in the opening direction on the cover flap by the inflating air bag, as a result of which the opening movement of the cover flap about the joints attached to one side edge is made possible.

German Offenlegungsschrift 38 11 373 discloses a cushion, which surrounds the air bag of an impact protection device, essentially with a box shape. That cushion is of integral construction with an insertion part onto which a cover layer made of a soft artificial resin is formed. The cover layer has at a predetermined point a thin-walled area which breaks when the air bag inflates. The insertion part also comprises a multiplicity of nets which are arranged on opposite sides of the thin-walled area and are connected to the upper area of the side walls of the box-shaped device. When the cover layer breaks along its thin-walled area, two flexible cover layer sections which are connected in each case to the side walls of the device and can be easily pushed to the side by the expanding air bag are thus formed.

An object of the present invention is to further improve the holding and coupling of one or more cover flaps of an impact protection device and, at the same time, reduce in particular the expenditure on production and fitting.

The foregoing object has been achieved in that, in a cover of an impact protection device of the type mentioned above, the at least one cover flap is injection molded onto a carrier part by a tough elastic plastic. The plastic surround has along a cover flap edge, intended as pivot axis, a cross-sectional tapering which serves as a hinge, and the plastic surround is constructed at at least one further edge of the cover flap as a groove. In the event of pressure on the at least one cover flap in the opening direction, the groove easily releases an edge, in particular the carrier part edge, which is held therein.

A holder and coupling according to the invention for a cover flap of a cover for an impact protection device consists of a single material, namely a tough elastic plastic, as a result of which the expenditure on production and fitting is considerably reduced with respect to that for known covers. The fact that no predetermined break points are provided in the cover according to the present invention also has the effect of simplifying manufacture and, furthermore, provides the possibility of reusing the cover with its plastic surround after an accident, if desired.

In one embodiment of the present invention, the carrier part is a separate carrier frame which is permanently connected to the frame of the dashboard. A further embodiment of the present invention provides for a construction of the cover which consists of two cover flaps arranged one on top of the other. In this embodiment, the upper one of the two cover flaps can be pivoted upwards and the lower one can be correspondingly pivoted downwards. Advantageously, the edges of the two cover flaps which face one another are also connected to one another by a tough elastic plastic which is securely connected to the edge of one cover flap. Towards the edge of the other cover panel, a groove is provided to hold this edge and easily release the edge in the event of pressure on the cover panel in the opening direction. The concept of the present invention for holding and coupling a cover flap can thus also be applied to covers consisting of several cover flaps.

In yet another embodiment of the present invention, the at least one cover panel of the cover is provided around its periphery with a tough elastic plastic surround.

BRIEF DESCRIPTION OF THE DRAWINGS

These and other objects, features and advantages of the present invention will become more readily apparent from the following detailed description thereof when taken in conjunction with the accompanying drawings wherein:

FIG. 1 is a longitudinal sectional view of a detail of a dashboard of a vehicle with an impact protection device and a cover according to the present invention;

FIG. 2 is an enlargement of the detail II shown in the dot-dash circle in FIG. 1;

FIG. 3 is an enlargement of the detail III shown in the other dot-dash circle in FIG. 1; and FIG. 4 is a plan view of a further embodiment of a cover according to the present invention.

DETAILED DESCRIPTION OF THE DRAWING

FIG. 1 is a schematic showing of a longitudinal section of a detail of a dashboard 1 of a vehicle in the area in front of the front passengers' seat. The dashboard 1 comprises a cover flap 2 of a cover of an impact protection device 3 which is arranged in a cavity behind the dashboard 1 above a glove compartment 4. The cover flap 2 is connected along its edges to a carrier part 5 by a surround made of tough elastic plastic in a manner shown more specifically in FIGS. 2 and 3. The carrier part 5 itself is securely connected to a frame 6 of the dashboard 1. The connection of the carrier part 5 to the frame 6 of the dashboard 1 can be effected, for example, by welding, riveting or bonding.

FIG. 2 shows an enlargement of the detail II in FIG. 1. This detail II comprises the edge areas of the cover flap 2 and of the carrier part 5 in the upper peripheral area of the cover flap 2. The cover flap 2 is permanently connected to the carrier part 5 also by a plastic surround made of tough elastic plastic 7 which engages in each case in a secure positive fashion around the edges 2a, 5a of the cover flap 2 and of the carrier part 5. In order to ensure secure engagement, the cover flap 2 and the carrier part 5 advantageously have in their edges 2a, 5a surrounded by tough elastic plastic 7 one or more holes 12, 15 into which the plastic 7 is also injection molded.

Since, in the event of an accident, the cover flap is also intended to pivot upwards along its upper edge 2a in order to clear an opening in the dashboard 1 for the inflating air bag of the impact protection device 3, the tough elastic plastic 7 is formed in the area between the edges 2a, 5a with a cross-sectional tapering 7a. This cross-sectional tapering 7a brings about a hinge function of the plastic surround at this longitudinal edge of the cover flap 2.

FIG. 3 of the drawing shows the detail III in FIG. 1 in enlarged form. This detail III comprises the junction area between the lower longitudinal edge 2b of the cover flap 2 and the corresponding edge 5b of the carrier part 5. The two edges 2b, 5b are in turn connected to one another also by a tough elastic plastic 7. The plastic surround 7 engages here positively and securely with one end around the lower edge 2) of the cover flap 2. At the same time, the edge 2b advantageously has holes (not illustrated) corresponding to the edges 2a, 5a, into which holes the plastic 7 is also injection molded.

The assigned edge 5b of the carrier part 5 is grasped by the plastic surround in a tight but not positively-engaging fashion by a groove 7d with essentially rectangular cross-section. In addition, the two legs 7b, 7c, which engage around the edge 5b, of the groove 7d have different leg thicknesses. The leg 7c which points towards the passenger compartment, that is to say in the opening direction of the cover flap 2, has at least the same thickness as the legs of the plastic surround 7 which are located at the opposite end of the plastic surround 7 and securely engage around the edge 2b, and the leg 7b which points towards the inside of the dashboard 1 is substantially thinner.

In the event of an accident, the inflating and expanding air bag of the impact protection device 3 presses from the inside against the cover flap 2. As a result of the pressure exerted on the cover flap 2, the plastic surround 7 is pulled down along its groove 7d in the direction of the arrow P2 by the edge 5b of the carrier part 5, and the cover flap 2 can open about the "hinge" 7a in the direction of the arrow P1. As a result, the air bag of the impact protection device 3 can expand into the passenger compartment. The pulling down of the plastic surround 7 by the edge 5b of the carrier part (5) is promoted by the weaker construction of the plastic leg 7b which rests against the inside of the edge 5b since, in the case of pressure from the inside onto the cover flap 2, the leg 7b can be easily deformed and thus easily releases the edge 5b. The greater thickness of the outer leg 7c prevents the cover flap 2 being pressed inwards towards the impact protection device 3 in the event of pressure on the dashboard 1 originating from the passenger compartment.

Advantageously, the cover flap 2 is injection molded around the periphery of the carrier part 5 by way of the tough elastic plastic 7. The side edges (not shown in the cross-sectional view) of the cover flap 2 are connected to the carrier part via a plastic surround of the type shown in FIG. 3. With a peripheral connection of the cover flap 2 to the carrier part 5, in the event foam is applied to the dashboard, no additional sealing against foam flowing into the inside of the dashboard 1 is then necessary.

In an embodiment of the cover with two cover flaps arranged one on top of the other, in each case the upper longitudinal edge of the upper cover flap and the lower longitudinal edge of the lower cover flap are advantageously coupled to the carrier part in a hinge-like fashion by a plastic surround with cross-sectional tapering in a manner similar to that shown in FIG. 2. The facing longitudinal edges of the two cover flaps are then connected to one another in the manner shown in FIG. 3 with a plastic surround which, in the event of pressure from the inside on the cover flaps, easily releases one of the edges of the cover flaps.

The present invention is, of course, not restricted to an embodiment with a single-component or a two-component cover flap. Embodiments with several flaps are also contemplated as shown in FIG. 4. The cover which is represented in a front view comprises six cover flaps 21, 22, 23, 24, 25, 26 which are provided in a carrier part 5 in a dashboard (not illustrated). The cover flap edges 2a which respectively adjoin the peripheral carrier part edge 5a are coupled to the carrier part 5 by a plastic surround with cross-sectional tapering as illustrated in FIG. 2. The edges which face one another are connected to one another, similar to the above-described embodiment, with an easily releasing plastic surround such as is illustrated in FIG. 3. In the embodiment of FIG. 4, the two upper flaps 21, 22 can pivot upwards and the two lower flaps 24, 25 can pivot downwards. The two central cover flaps 23, 26 which are arranged in a wedge shape between the upper cover flaps 21, 22 and lower cover flaps 24, 25 are configured to pivot open laterally about their edges 2a. The arrangement illustrated in FIG. 4 is suitable as, for example, a cover for an impact protection device arranged behind a dashboard which arches in the horizontal plane.

A cover which consists of more than one cover flap can of course have the most varied geometrical shapes. Thus, for example, a circular cover is possible, in which case the individual cover flaps are constructed as circular segments joined to one another. Furthermore, the single cover flap or more than one cover flaps and the carrier part can be produced from the same material as the plastic surround. In particular, an integral construction of the cover with the carrier part along the sections with cross-sectional tapering which serve as hinge is thus possible, as a result of which the expenditures for production and fitting are reduced.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A cover for an air bag of an impact protection device for occupants of a vehicle, comprising a carrier part, at least one upwardly pivotable cover flap operatively arranged in the dashboard of a vehicle, and a tough elastic plastic surround which is injection molded onto the at least one cover flap and onto the carrier part, wherein the plastic surround has, along a pivot axis edge of the cover flap, a cross-sectional tapering configured to serve as a hinge, and said plastic surround is constructed at at least one further edge of the cover flap as a groove which, in the event of pressure on the at least one cover flap in an opening direction, easily releases an edge which is held in the groove.

2. The cover according to claim 1, wherein the edge held in the groove is an edge of the carrier part.

3. The cover according to claim 1, wherein the carrier part is a separate carrier frame securely connected to a frame of the dashboard.

4. The cover according to claim 3, wherein the edge held in the groove is an edge of the carrier part.

5. The cover according to claim 1, wherein the at least one cover flap comprises two cover flaps arranged one on top of the other, the upper one of which can pivot upwardly and the lower one of which can pivot downwardly.

6. The cover according to claim 5, wherein the edge held in the groove is an edge of the carrier part.

7. The cover according to claim 5, wherein the carrier part is a separate carrier frame securely connected to a frame of the dashboard.

8. The cover according to claim 1, wherein the at least one cover flap comprises a plurality of cover flaps which can pivot upwardly, downwardly and to the side.

9. The cover according to claim 8, wherein the edge held in the groove is an edge of the carrier part.

10. The cover according to claim 8, wherein the carrier part is a separate carrier frame securely connected to a frame of the dashboard.

11. The cover according to claim 5, wherein facing edges of the cover flaps are connected to one another by a tough elastic plastic which is securely connected to the edge of the one cover flap and towards the edge of the other cover flap has a groove which holds said latter edge and clears said latter edge in the opening direction in the event of pressure on the cover flap.

12. The cover according to claim 8, wherein facing edges of the cover flaps are connected to one another by a tough elastic plastic which is securely connected to the edge of the one cover flap and towards the edge of the other cover flap has a groove which holds said latter edge and clears said latter edge in the opening direction in the event of pressure on the cover flap.

13. The cover according to claim 1, wherein the groove, which releases an edge, comprises a flexible leg which, in the event of pressure on the cover flap in the opening direction, brings about release of the edge grasped by the groove.

14. The cover according to claim 1, wherein the at least one cover flap has a periphery with a tough elastic plastic surround.

15. The cover according to claim 1, wherein the edges of the cover flaps and of the carrier part which are securely connected to the plastic surround have holes into which the plastic surround is injection molded.

16. The cover according to claim 1, wherein the at least one cover flap, the carrier part and the tough elastic plastic of the plastic surround constitute a single-component construction at tapering sections.

17. The cover according to claim 16, wherein the edge held in the groove is an edge of the carrier part.

18. The cover according to claim 16, wherein the carrier part is a separate carrier frame securely connected to a frame of the dashboard.

19. The cover according to claim 16, wherein the at least one cover flap comprises two cover flaps arranged one on top of the other, the upper one of which can pivot upwardly and the lower one of which can pivot downwardly.

20. The cover according to claim 16, wherein the at least one cover flap comprises a plurality of cover flaps which can pivot upwardly, downwardly and to the side.

* * * * *